(12) United States Patent
Kingetsu et al.

(10) Patent No.: US 6,268,935 B1
(45) Date of Patent: *Jul. 31, 2001

(54) IMAGE PROCESSOR

(75) Inventors: Yasuhiro Kingetsu; Ken Ohta, both of Kobe; Manji Takano, Amagasaki, all of (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/422,791

(22) Filed: Apr. 17, 1995

(30) Foreign Application Priority Data

| Apr. 15, 1994 | (JP) | 6-077231 |
| Jan. 30, 1995 | (JP) | 7-012851 |

(51) Int. Cl.[7] .............................. H04N 1/415; H04N 1/40
(52) U.S. Cl. ........................... 358/433; 358/462; 358/467
(58) Field of Search .................................. 358/433, 462, 358/463, 464, 467; 382/175, 176, 177, 180, 266, 275, 281

(56) References Cited

U.S. PATENT DOCUMENTS

| 4,685,143 | * | 8/1987 | Choate | 382/25 |
| 4,707,647 | * | 11/1987 | Coldren et al. | 318/568 |
| 4,811,239 | * | 3/1989 | Tsao | 364/519 |
| 5,170,440 | * | 12/1992 | Cox | 382/22 |
| 5,239,596 | * | 8/1993 | Mahoney | 382/180 |
| 5,243,668 | * | 9/1993 | Kitamura | 382/53 |
| 5,268,967 | * | 12/1993 | Jang et al. | 382/180 |
| 5,293,429 | * | 3/1994 | Pizano et al. | 382/24 |
| 5,293,430 | * | 3/1994 | Shiau et al. | 382/173 |
| 5,331,442 | * | 7/1994 | Sorimachi | 358/532 |
| 5,381,241 | * | 1/1995 | Kawanaka | 358/462 |
| 5,381,489 | * | 1/1995 | Bernzott et al. | 382/40 |
| 5,465,308 | * | 11/1995 | Hutcheson | 382/159 |
| 5,566,255 | * | 10/1996 | Pavlidis | 382/317 |

FOREIGN PATENT DOCUMENTS

| 61-289764 | 12/1986 | (JP) . |
| 3-126180 | 5/1991 | (JP) . |

* cited by examiner

Primary Examiner—Kimberly A. Williams
(74) Attorney, Agent, or Firm—Burns, Doane, Swecker & Mathis, LLP

(57) ABSTRACT

An image processing apparatus includes a receiving device for receiving image data for an original image; a dividing device for dividing the image data into a plurality of small blocks, each of the small blocks containing a plurality of pixels; a first determining device for determining an attribute of each of the plurality of small blocks; and a second determining device for determining an attribute of an area that includes the plurality of small blocks based on the attributes of the small blocks.

2 Claims, 14 Drawing Sheets

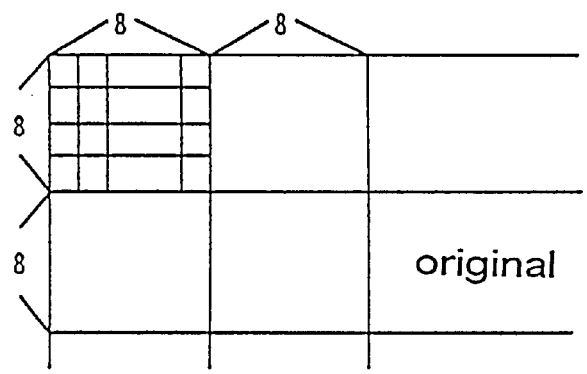
Fig.2
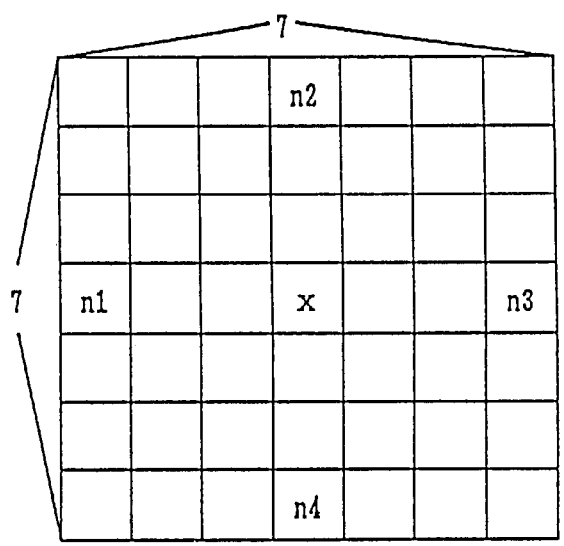
x : object picture element
n : compared picture element
Fig.3
| 1/9 | 1/9 | 1/9 |
|-----|-----|-----|
| 1/9 | 1/9 | 1/9 |
| 1/9 | 1/9 | 1/9 |
Fig.4

IMAGE PROCESSOR

BACKGROUND OF THE INVENTION

1. Field of the Invention

The present invention relates to an image processor for use in apparatus which process read image data such as facsimile machines, digital copying apparatus and the like, and more specifically relates to an image processor and image processing method used for processing image data comprising a mixture of character sections, photograph sections, and dot sections in one image.

2. Description of the Related Art

In conventional facsimile machines and the like, image processing can be executed which is suitable for text when an entire document is a text document, and image processing can be executed which is suitable for photographs when an entire document is a photographic document. Such image processing is disadvantageous, however, when text and photographs are mixed in the document image of a single sheet document, inasmuch as it is difficult to independently realize image processing for each text section and photograph section.

Japanese Unexamined Patent Application Nos. SHO61-289764 and HEI3-126180 disclose conventional technology for eliminating the previously described disadvantages. These patent applications disclose processes for discriminating text sections and photographic sections of a document beforehand, and selectively processing image regions having similar attributes simultaneously so as to realize independent processing of text and photographs contained in the document image of a single document sheet.

The subject of Japanese Unexamined Patent Application No. SHO61-289764 relates to facsimile apparatus, and the image data processed are binary data. The region extraction is accomplished using the binary data run length (lines of white picture elements or black picture elements). Japanese Unexamined Patent Application No. HEI3-126180 binarizes input image data, and extracts image regions having similar attributes from among said binarized image data as square-shapes circumscribing said regions.

However, the aforesaid conventional technologies are disadvantageous inasmuch as a long time is required for processing and large-capacity memory is also required because the data processed whenever extracting regions and discriminating attributes are picture element data for the entire document image.

Furthermore, the aforesaid conventional technologies both are only capable of handling rectangular and square regions extracted by attributes.

SUMMARY OF THE INVENTION

An object of the present invention is to provide an image processor and method for processing an image capable of extracting regions and accurately distinguishing attributes of said regions at high speed with little memory.

Another object of the present invention is to provide an image processor and method for processing an imag capable of extracting regions and accurately distinguishing the attributes of said regions wherein said regions are not limited to rectangular and square shapes and may be complex polygons.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

FIG. 2 is an illustration showing a document divided into blocks;

FIG. 3 is an illustration showing an isolated point count filter;

FIG. 4 is an illustration showing erroneously distinguished block extraction filter;

DETAILED DESCRIPTION OF THE PREFERRED EMBODIMENTS

Figure 1:
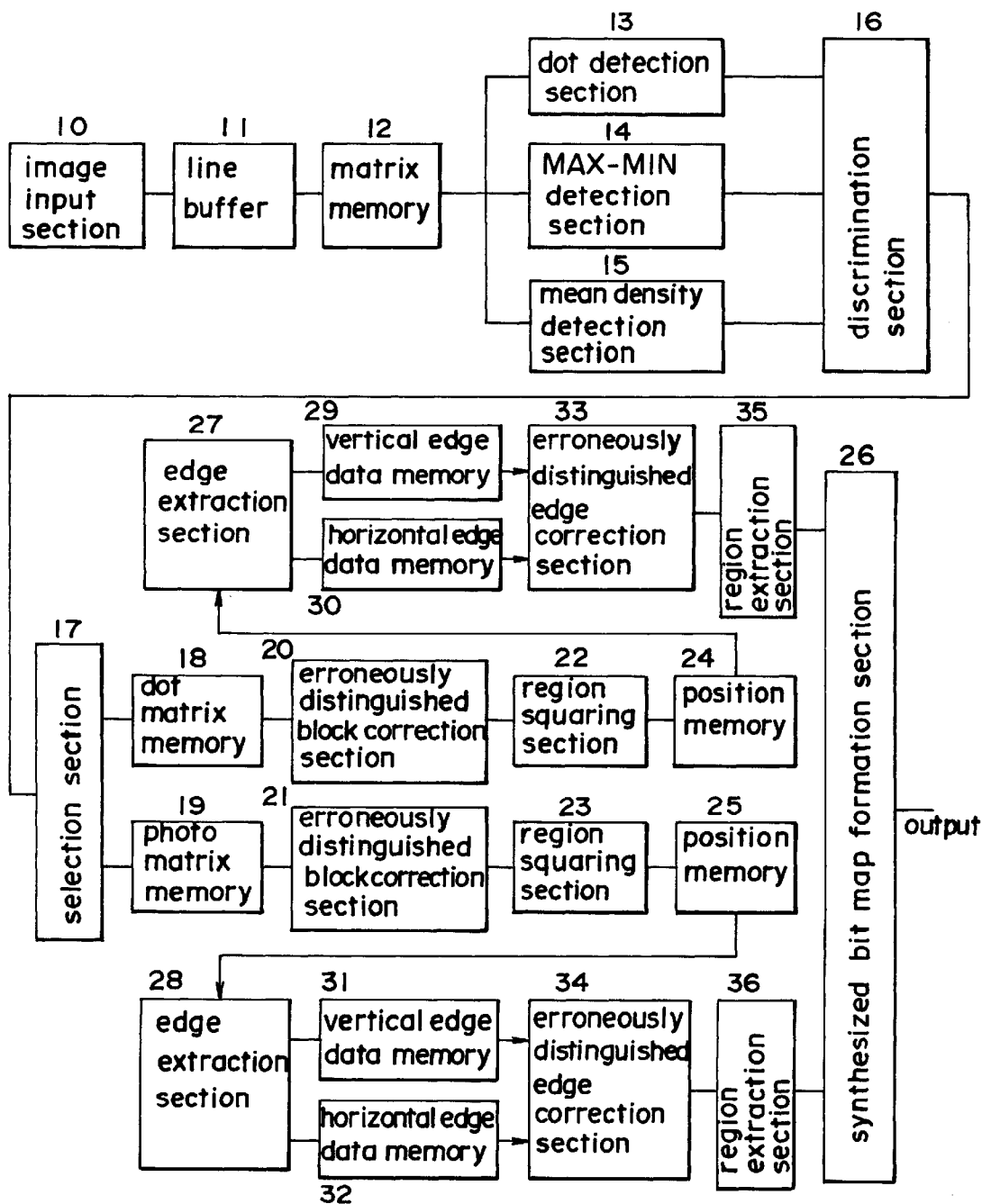
FIG. 1 is a block diagram showing the construction of the image processor of the present invention.

The preferred embodiments of the present invention are described hereinafter. FIG. 1 is a block diagram showing the construction of the image processor of the present invention. In the diagram, various processing sections are provided, and the processes of each processing section are executed by a central processing unit (CPU) not shown in the drawing.

In image input section 10, each picture element of a document image is read by an image sensor such as, for example, a charge-coupled device (CCD) or the like arrayed linearly in a main scanning direction, for example disclosed in U.S. Pat. No. 5,283,662. The read picture element data are input to line buffer 11 in one-line units in the main scan direction, and are thereafter stored in matrix memory 12. All picture element data of a document are stored in matrix memory 12 by sequential subscanning of the document. Picture element data are typically expressed in 256 halftones (8-bit).

In the following processing blocks, the picture element data stored in matrix memory 12 are processed, and the document image is classified by attributes of dot regions, photograph regions, character regions, and background regions. Dot regions are the image regions represented in halftone dots such as photographs in a newspaper; photograph regions are the image regions represented in smooth halftone density; character regions are regions comprising text mainly represented in tones; background regions are regions having the same color as the background color of the document. In the present embodiment, dot regions and photograph regions are extracted from the document image and distinguished from other regions.

In the following processes, a document is hypothetically divided into blocks of 8×8 picture elements, as shown in FIG. 2, and processed in block units. The size of the blocks is not limited to 8×8 picture elements, and other suitable sizes (m×n picture elements) may be used.

In order to distinguish the attribute (dot, photograph, character, background) of each block, a specific amount inherent to each block is variously calculated in dot detection section 13, MAX-MIN detection section 14, and mean density detection section 15.

Dot detection section 13, counts the isolated dots (collection of white picture elements or black picture elements comprising the dots) present within each block, and processes said dots for all picture elements within each block (64 picture elements) through isolated dot count filter so as to compare the object picture element density X with the four picture element densities n1, n2, n3, n4 separated by three block from said object block in all four vertical and lateral directions (refer to FIG. 3). That is, the isolated dot count filter is used 64 times relative to a single block, and counts picture elements satisfying the following discrimination criteria as dot value N.

X>max (n1, n2, n3, n4) or
X<min (n1, n2, n3, n4)

Since the isolated dot count filter cannot be used for the outermost blocks of a document, zero or the value of adjacent interior block is used as the dot value N of such blocks.

MAX-MIN detection section 14 examines the scattering of picture element density within each block, and calculates the density difference D between maximum and minimum picture element densities within each block. Mean density detection section 15 calculates the mean density A of 64 picture elements to obtain the density of each block.

As described above, three data (dot value N, density difference D, and mean density A) are calculated for all blocks within a document. The attribute of each block is distinguished in discrimination section 16 using the aforesaid data.

The discrimination sequence first distinguishes dot blocks. Dot images are the most specific images among attributes, and can be distinguished with high accuracy using only the dot value N. Character blocks are distinguished following dot blocks. Character blocks typically are black and white binary images, such that blocks having a large density difference D are distinguished as character blocks.

Then, photograph blocks are distinguished. The density difference D is considered to be not very large in photograph blocks, such that blocks having a certain degree of density difference D (density difference D is less than that of character blocks) are distinguished as photograph blocks. However, since all photograph blocks cannot be distinguished using only this criterion, blocks having a certain degree of mean density A are also distinguished as photograph blocks. Thereafter, the remaining blocks are distinguished as background blocks. Background blocks in a typical document are presumed to be white or light colored.

The following criteria express the control of the aforesaid discrimination. T1~T4 are predetermined threshold values.

| if      | N > T1 | then | dot block |
| else if | D > T2 | then | charcater block |
| else if | D > T3 | then | photo block (T2 > T3) |
| else if | A > T4 | then | photo block |
| else    |        |      | background block |

After the attribute of each block is distinguished by the aforesaid methods, dot blocks and photograph blocks are selected in selection section 17, and stored as bit maps in dot matrix memory 18 or photo matrix memory 19. That is, [1] is assigned to blocks distinguished as dots, and [0] is assigned to other blocks in the dot matrix memory 18. Furthermore, [1] is assigned to blocks distinguished as photographs, and [0] is assigned to other blocks in the photo matrix memory 19.

In erroneously distinguished block correction section 20 and 21, blocks judged to have been erroneously. identified in discrimination section 16, so-called noise blocks, are corrected. This correction is accomplished by checking the attributes of blocks surrounding the object block, and changing the attribute of said object block to that of the surrounding blocks when the attribute of said object block diverges from that of the surrounding blocks. In the present embodiment, this correction is accomplished by a smoothing process using the filter shown in FIG. 4.

The aforesaid filter multiplies the values of the eight blocks surrounding the object block (i.e., [1] or [0]) by ⅑, and uses the sum of the resultant values as the value of the object block.

When the filter are used for each dot map and photo map assigned [0] or [1] and the value of the object block is ⅝ or greater, the block is assigned [1], whereas when the value of the object block is ⅘ or less, the block is assigned [0].

That is, when the object block value is ⅘ or less, the object block attribute is discriminated as diverging from the surrounding attributes, and the object block value is corrected. Since the aforesaid filters cannot be used with the outermost blocks of a document, these blocks are assigned [0] or a value of the adjacent interior.

Dot blocks and photograph blocks are distinguished by the aforesaid process. Thereafter, in region squaring sections 22 and 23, the each distinguished block region is extracted as a square, and its position coordinates are stored in position memories 24 and 25. Thereafter, the edge of the blocks within the aforesaid squares are extracted in edge extraction sections 27 and 28, and the edge data are stored in edge data memories 29~32. Then, in erroneously distinguished edge correction sections 33 and 34, erroneously distinguished edges are corrected, and the regions are extracted in region extraction sections 35 and 36.

The processes executed in dot region squaring section 22, edge extraction section 27, and error edge correction section 33 are described in detail hereinafter. Processing relating to photograph regions are identical to processing relating to dot regions and are, therefore, omitted from the discussion.

Figure 5A:
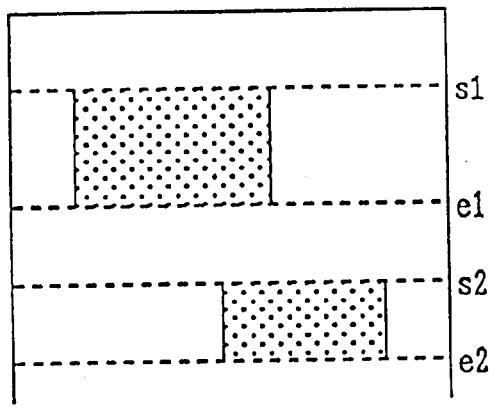
FIGS. 5a and 5b show extracted regions.

First, the processing of dot squaring section 22 is described. FIG. 5a shows dot regions (dotted area in the drawing) within a dot matrix. These dot regions are extracted in accordance with the process of the flow chart of FIG. 7.

In step S1, the flag indicating the presence of a dot block in the scan line is set at [0] (this flag is set at [0] when a dot block is not present in the scan line, and this flag is set at [1] when a dot block is present). Then, in step S2, scanning is executed for each one-line in a downward direction in the drawing from a first line of dot matrix memory, and a check is made to determine whether or not a dot block is present in the line (step S3). When a dot block is present in the line and the flag is set at [0] (step S5), said flag is set at [1] in step S6, and the current scan line position is stored in memory as the region starting line.

Thereafter, line scanning continues, and when a line without a dot block is detected in step S3 and the flag is set at [1] (step S4), the position one line prior to the current scan line position is stored in memory as the region ending line (step S7). Thus, the region circumscribed by region starting line s1 and region ending line e1 is extracted, as shown in FIG. 5a.

Subsequently, scanning continues until the scan line attains the final line (step S11), whereupon all areas containing dot regions are extracted. FIG. 5a shows a second region (region from region starting line s2 to region ending line e2) extracted.

In the aforesaid extraction, when the width of an extracted region (length between the region starting line and the region ending line) is less than a predetermined length, is viewed as a dot block not corrected by erroneously distinguished block correction section 20 (i.e., erroneously distinguished), and is not extracted (steps S8, S9).

Figure 5B:
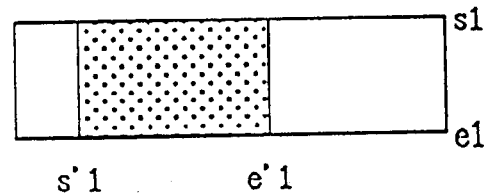
Figure 7:
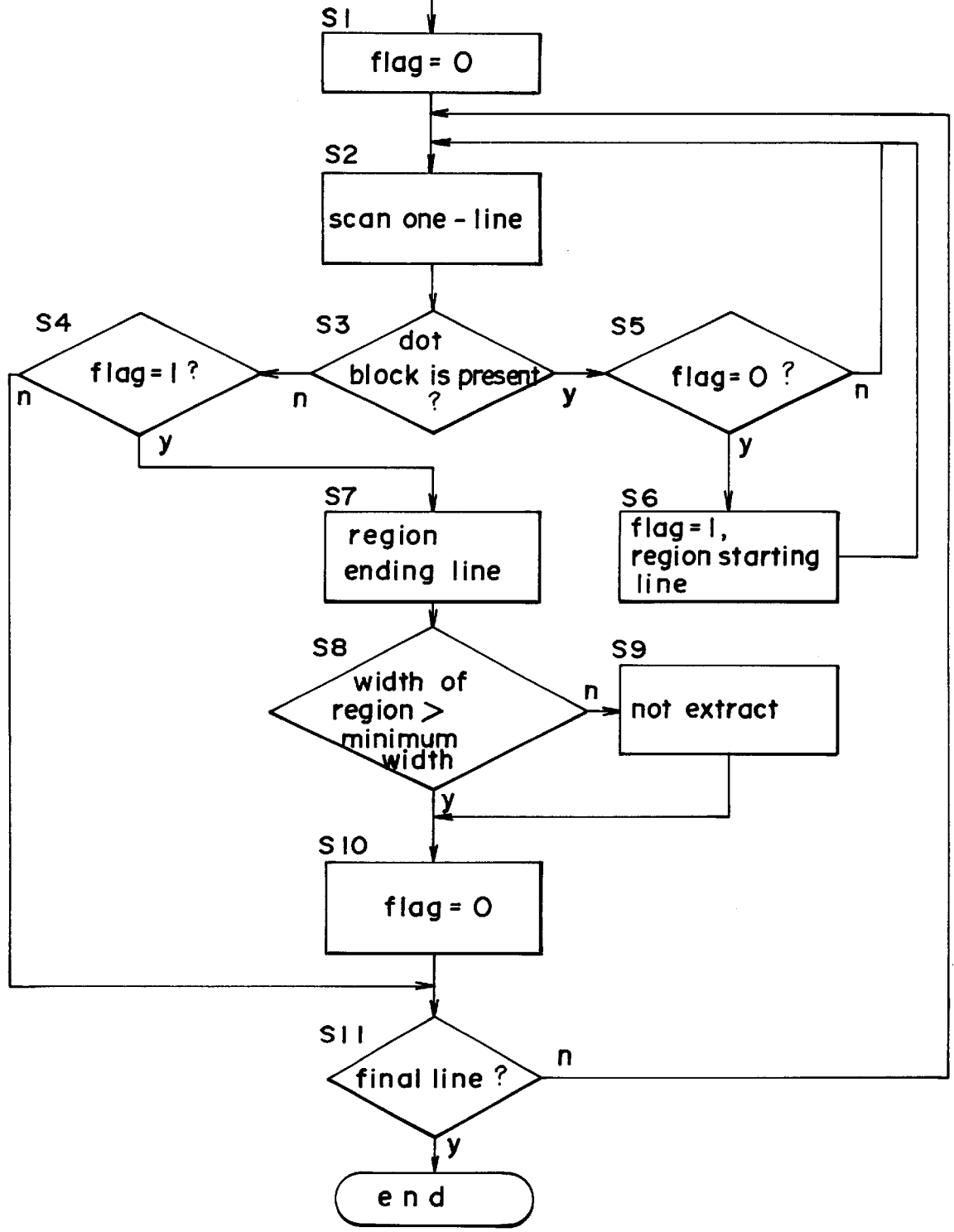
FIG. 7 is a flow chart for region extraction.

Then, the scan direction is changed 90° relative to each region extracted by the process described above by a process identical to the process shown in the flow chart of FIG. 7. The result of said process is that the region circumscribed by, for example, region starting line s1 and region ending line e1 is extracted as the actual dot region (region circumscribed by lines s1, e1, s'1, e'1) in FIG. 5b.

Figure 6A:
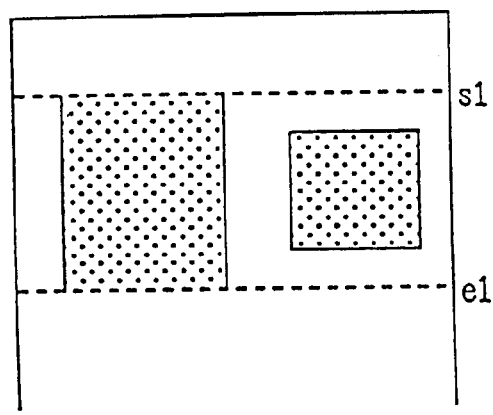
FIGS. 6a and 6b show extracted regions.
Figure 6B:
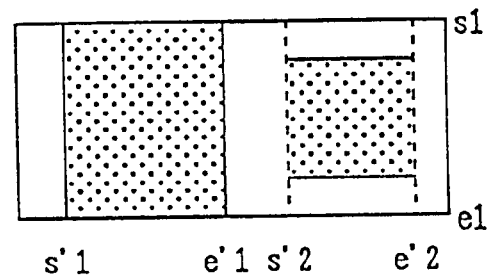

As a unique example, consider the case wherein a dot region of a document is arranged as shown in FIG. 6a. In this instance, processing can also be basically accomplished via the flow chart of FIG. 7. That is, the actual dot region is extracted by changing the scan direction 90° (same direction as the first scan) and executing the same process relative to the region (the region circumscribed by lines s1, e1, s'2, e'2 shown in FIG. 6b) extracted by the results of the aforesaid two processes.

In edge extraction section 27, the edge area of a labeled dot block is extracted. This edge area extraction is accomplished only within a square region stored in square position memory 24.

When [1] is assigned to a dot block and [0] is assigned to other blocks in a dot map, calculations relative to two dot blocks laterally adjacent to the subject block (right block)-(left block) are all calculated as dot blocks. When the result of these calculations are [1], [1] is assigned as the edge block of the right side dot block among the two blocks for which calculation is executed. When the result of these calculations are [−1], [−1] is assigned as the edge block of the left side dot block among the two blocks for which calculation is executed. [0] is assigned for edge blocks of all other dot blocks.

When considering dot block [1] at the leftmost block of a dot map, [1] is assigned as the edge block of said block.

When considering dot block [1] at the rightmost block in a dot map, [−1] is assigned as the edge block of said block.

As a result, the edge block on the left side of a dot block is assigned [1], the edge block on the right side of a dot block is assigned [−1], and all other blocks are assigned [0]. The result is stored in horizontal edge data memory 30 as edge data in the horizontal direction.

When both right and left block of a dot block assigned [1] are dot blocks assigned [0], the block is [1] edge block (dot region left side edge), or [−1] edge block (dot region right side edge). Edge data of the block is stored for both values [1] and [−1].

Similar calculations relative to two dot blocks vertically adjacent to the subject block (upper block)-(lower block) are all calculated as dot blocks. When the results of the aforesaid calculations are [1], [1] is assigned as an edge block to the dot block on the lower side among the two blocks calculated. When the results of the aforesaid calculations are [−1], [−1] is assigned as an edge block to the dot block on the upper side among the two blocks calculated. [0] is assigned to other dot blocks as edge blocks.

When a dot block assigned [1] is the uppermost block in a dot map, [1] is assigned to this block as an edge block. When a dot block assigned [1] is the lowermost block in a dot map, [−1] is assigned to this block as an edge block.

As a result, edge block on the upper side of a dot block are assigned [1], and edge blocks on the lower side of a dot block are assigned [−1], and all other blocks are assigned [0]. The result is stored in vertical edge data memory 29 as edge data in the vertical direction.

When both blocks above and below a dot block assigned [1] are dot blocks assigned [0], said block is [1] edge block (top edge of the dot region), and [−1] edge block (bottom edge of dot region). Edge data of the block is stored for both values [1] and [−1].

Edge data in the horizontal direction and edge data in the vertical direction are mutually independent.

Erroneously distinguished edge correction section 33 is described hereinafter. In the erroneously distinguished edge correction section, erroneously distinguished edges generated by erroneously distinguished blocks are corrected. Specifically, although an edge may actually be a straight line, when distinguished as a disconnected line, processing is executed to correct said disconnected line to a continuous straight line.

In the present embodiment, linear extraction algorithm by Hough transform is used in the erroneously distinguished edge correction process. The linear extraction algorithm by Hough transform is briefly described hereinafter.

Figure 8:
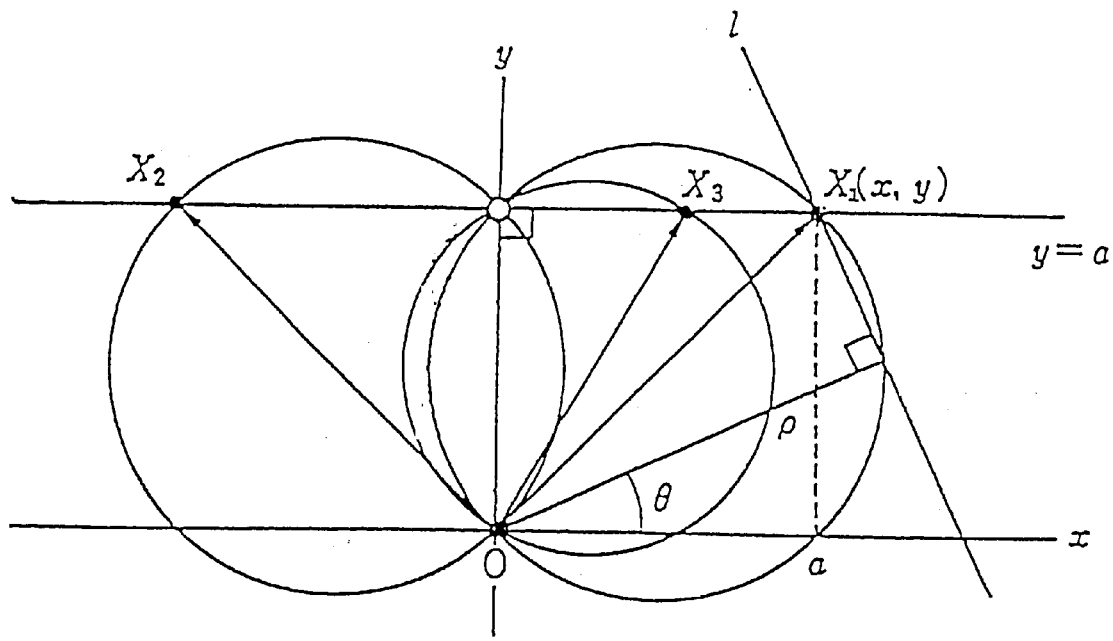
FIG. 8 is an illustration of linear extraction on the X-Y plane via Hough transform.

Linear extraction, in the case of points on an X-Y plane, perceives a straight line as having the majority of said points aligned on said line. In FIG. 8, for example, points X1, X2, X3 are aligned on a straight line Y=a, such that linear extraction from said three points extracts the straight line Y=a.

Details are described below. The form of a straight line most familiar on an X-Y plane is Y=aX+b using sloe a of a straight line and Y axis section b as parameters. However, the aforesaid form is not used, but rather the length ρ of a perpendicular line dropping from origin point o in a straight line and angle θ formed by said perpendicular line and the X-axis are used as parameters to derive the following.

$$\rho = X \cos \theta + Y \sin \theta$$

Consider a optional straight line 1 at point X1 (x,y) on a plane (refer to FIG. 8). When perpendicular line relative to said line X1 drop from origin point o, the length of the perpendicular line is designated ρ, and the angle formed by said perpendicular line relative to the X-axis is designated θ, such that the point representing ρ and θ is obvious. When this point is designated (ρ, θ), a straight line can be optionally represented via said point (ρ, θ) as being a unique point of straight line 1.

As shown in FIG. 8, unique point (ρ, θ) of a optional straight line 1 through point X1 (x,y) on a plane is on a circle wherein origin o and X (x,y) define a diameter. This is the characteristics of a circle, and is clearly understood since the angle of circumference of the diameter (in this instance, the diameter is line segment O-X1) is 90°.

Figure 9:
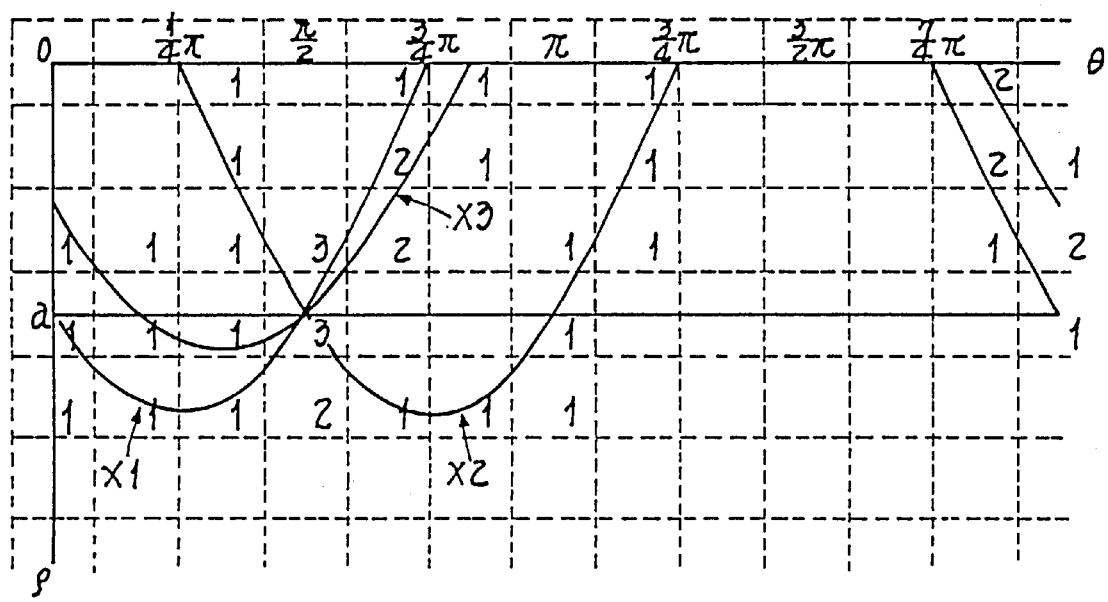
FIG. 9 is an illustration of linear extraction on the $\rho$-$\Phi$ plane via half conversion.

In FIG. 8, unique point (ρ, θ) of a optional straight line passing through points X1, X2, X3 are traced on the ρ-θ plane and are shown in FIG. 9. A single point on the X-Y plane in the illustration correspond to a single sine wave curve on the ρ-θ plane.

When actually processed by a computer, this is a discrete process, and requires that the ρ-θ plane be subjected to discreteness, i.e., divided into regions. The grid of FIG. 9 shows the minimum unit region when discrete ρ, θ is set. The curves formed by tracing a single point on the X-Y plane on the p-θ plane for each p-θ region are counted. The numbers on the grid of FIG. 9 represent the count numbers of the grid (regions).

ρ, θ of the region having the majority of count numbers indicates the unique point (ρ, θ) of a straight line passing through three points X1, X2, X3. Thus, a straight line passing through points X1, X2, X3 from unique point (ρ, θ) is obvious.

In FIG. 9 although there are two count numbers for three regions (this point is discussed later), when the region wherein ρ is a and θ is π/2 is designated the region having the majority of count numbers, the form of the straight line passing through the three points X1, X2, X3 is as follows.

$$a = X \cos(\pi/2) + Y \sin(\pi/2)$$

That is, Y=a, and thus linear extraction is accomplished.

The line extracted in the aforesaid manner is a straight line representing the edge of an image.

In FIG. 9, there are two regions with a count number of three (maximum), as previously mentioned, and linear extraction is accomplished from three points, but actually linear extraction is accomplished from many more than three points, such that one region has a maximum count number because the region of the ρ-θ plane (grid of FIG. 9) is set very fine. If two or more regions have a maximum count number a plurality of extractions are accomplished beforehand for straight lines based on the respective ρ, θ values. In the present embodiment, proper edge correction is accomplished by a region writing process described later even when a plurality of straight lines are detected and attributable to the discrete process.

In the present embodiment, straight line extraction is accomplished not only for region shaving a maximum count number, but also for regions having count numbers above a threshold value, and edge correction is accomplished for said extracted plurality of straight lines.

Four examples relating to specific edge correction processes are described hereinafter.

Edge Correction Process 1

Figure 10:
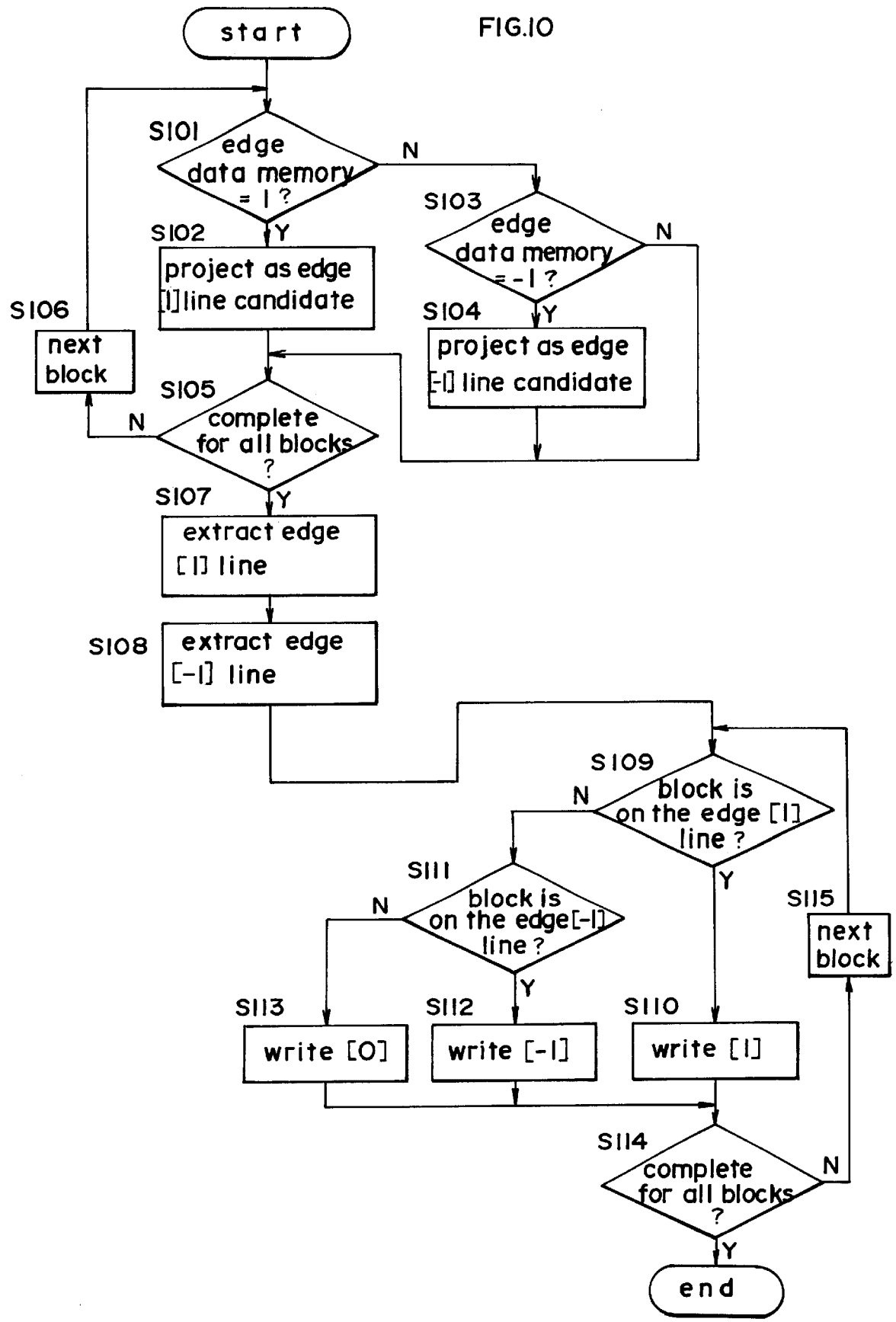
FIG. 10 is a flow chart of edge correction process 1.
Figure 11:
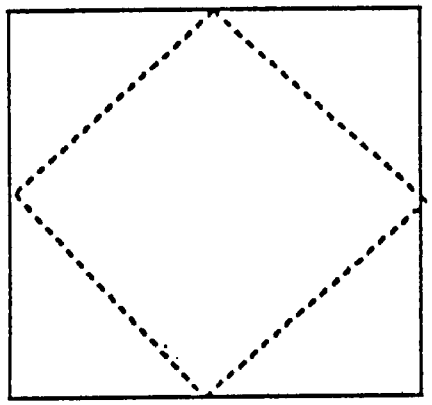
FIG. 11 is an illustration showing the edge of a dot region including erroneously distinguished blocks.
Figure 12:
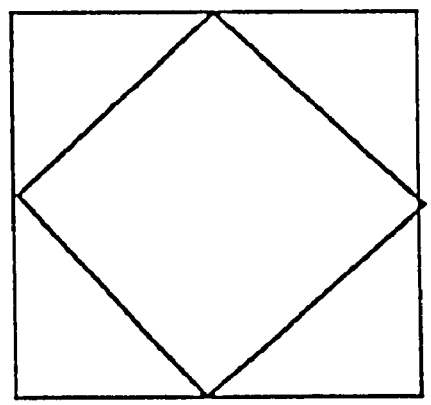
FIG. 12 is an illustration showing the edge of a dot region after edge correction processing.

FIG. 11 shows the edge of a dot region (dashed line in the drawing) in a dot map including an erroneously distinguished block. The edge of this dot region is processed in accordance with the flow chart of FIG. 10, and is corrected to the edge shown in FIG. 12.

The flow chart of FIG. 10 is described below. Each block within a square is checked to determine whether or not the value in edge data memory is [1] (step S101). If the edge data memory value is [1], the position (point) of that block is projected on the ρ-θ plane as edge [1] line candidate (step S102). The aforesaid projection is the counting of each region on the ρ-θ plane described by linear extraction via Hough transform. Blocks discriminated as not having a value of [1] in the edge data memory in step S101 are then checked to determine whether or not the value in edge data memory of [−1] (step S103). If the edge data memory value is [−1], the position (point) of the block is projected on the ρ-θ plane as edge [−1] line candidate (step S104).

In step S105, a check is made to determine whether or not processes of steps S101–S104 have been completed for all blocks within the square. If process has not been completed for all blocks, the processing continues to the next block (step S106), and steps S101–S104 are repeated. When processes of step S101–S104 have been completed for all blocks within the square, the process continues to step S107.

In step S102, region ρ, θ having several projections is extracted as edge [1] line candidate (step S107). Similarly, region ρ, θ having several projections in step S104 is extracted as edge [−1] candidate (step S108).

Each block within the square is checked to determine whether or not the point is on the edge [1] line extracted in step S107 (step S109), and if the block is on said line label [1] is written (step S110). Other blocks are checked to determine whether or not points are on the edge [−1] line extracted in step S108 (step S111), and if said block is on the line, label [−1] is written (step S112). Label [0] is written to other blocks (step S113).

In step S114, a check is made to determine whether or not processes of steps S109–S113 have been completed for all blocks within a square. If the aforesaid processes have not been completed for all blocks, the routine advances to the next block (step S115), and processes of steps S109–S113 are repeated.

Processes are executed for edge data in the vertical direction and horizontal direction, and corrected edge data are written to edge memories 29 and 30.

Figure 14:
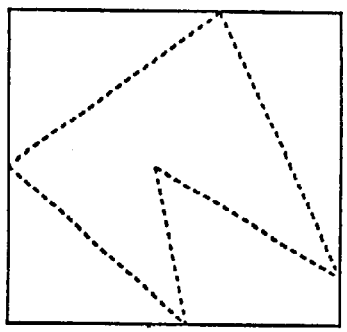
FIG. 14 is an illustration showing the edge of a dot region including erroneously distinguished blocks.
Figure 15:
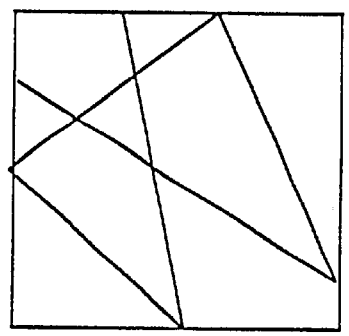
FIG. 15 is an illustration showing the edge of a dot region after erroneous edge correction processing.

If the edge illustrated in FIG. 14 is corrected by the previously described method, the result is shown in FIG. 15, such that accurate edge correction is not achieved. Edge correction process 2 corrects the aforesaid problem and is described below.

Edge Correction Process 2

Figure 16:
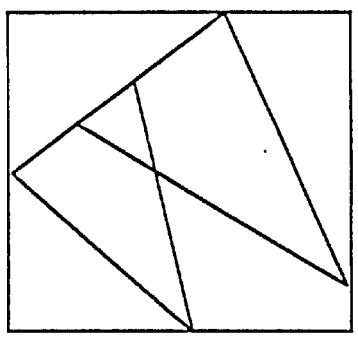
FIG. 16 is an illustration showing the edge of a dot region after edge correction processing.

FIG. 14 shows an edge (dashed line in the drawing) of a dot region in a dot map including erroneously distinguished blocks. The edge of this dot region is processed in accordance with the process shown in the flow chart of FIG. 13, and is corrected as shown in FIG. 16.

Figure 13:
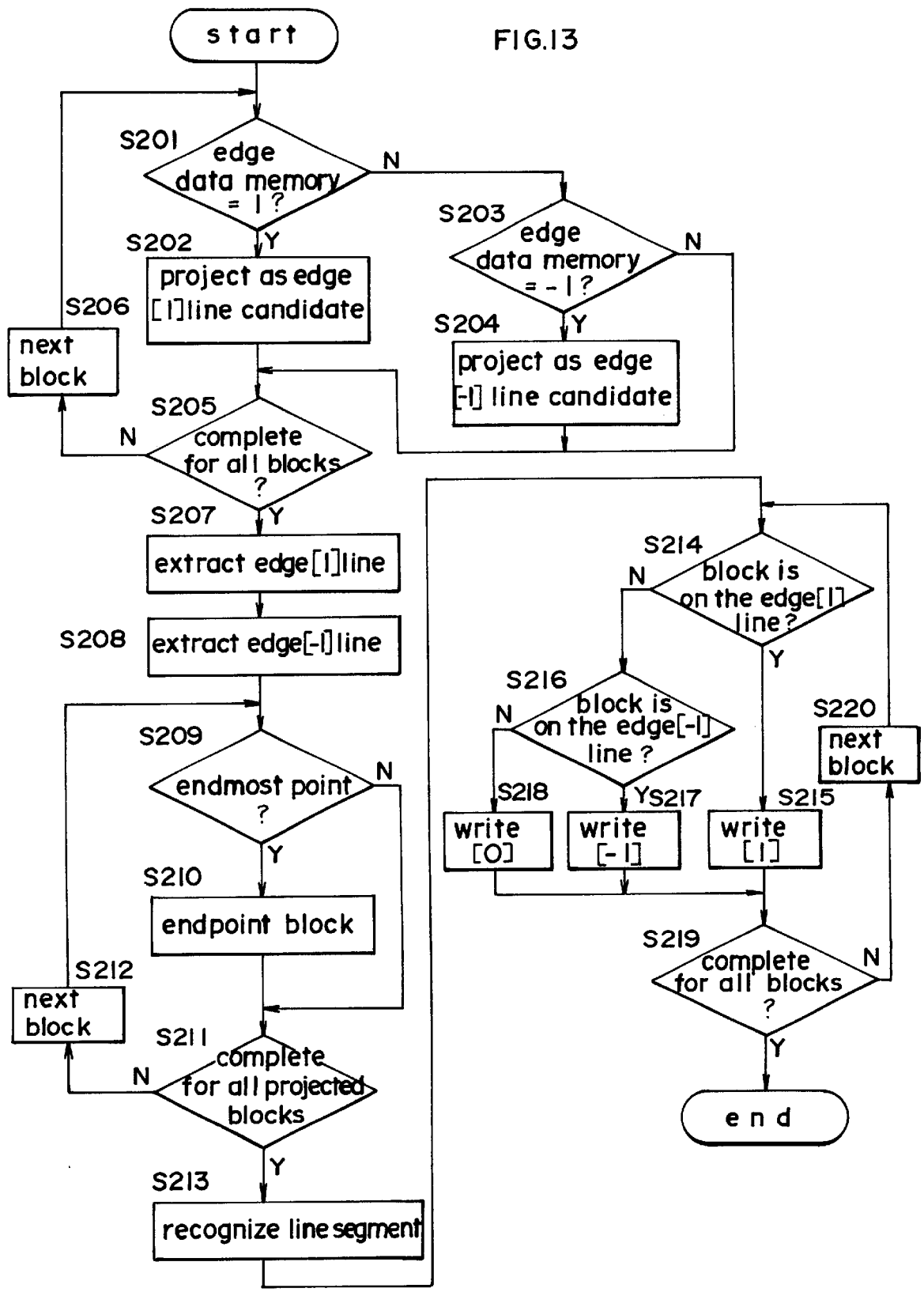
FIG. 13 is a flow chart of edge correction process 2.

The flow chart of FIG. 13 is described below. Steps S201~S208 are identical to edge correction process 1 (steps S101~S108 in the flow chart of FIG. 10). Points projected as line candidates in steps S202 and S204, are checked to determine whether or not they are the endmost points of the line extracted in steps S207 and S208 (step S209).

Figure 17:
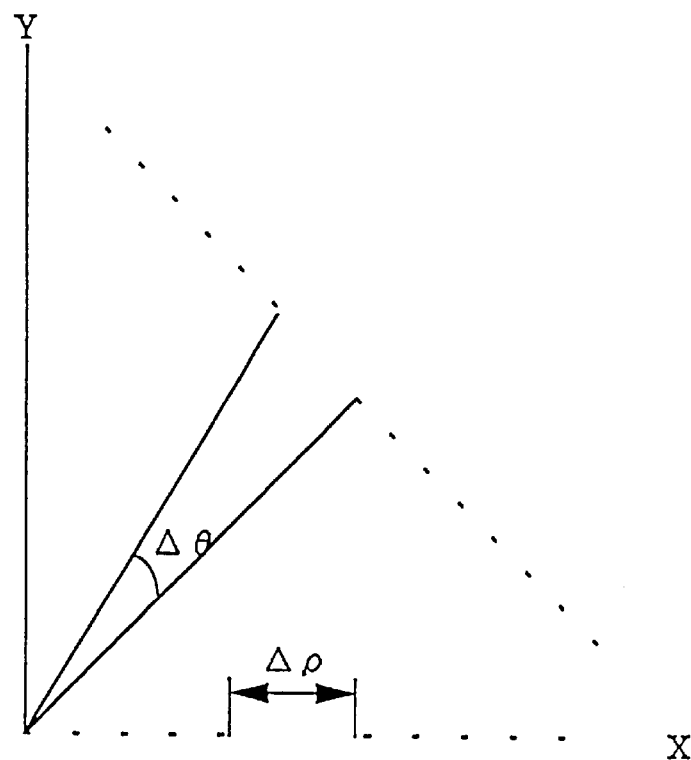
FIG. 17 is an illustration showing $\rho$ and $\Phi$ imaged on the X-Y plane.

For example, if the point (block) projected as a line candidate is compared to the magnitude of θ, it is understood to be an endpoint block. That is, the blocks having a maximum magnitude θ and minimum magnitude θ among the projected points are the endpoint blocks. When a line candidate corresponds to X-axis or Y-axis, projected points all have the same value θ, but the endpoints can be discerned when the ρ values are compared. In the case of images on an X-Y plane, this process is the same as FIG. 17.

The block distinguished as an endmost point (endpoint) of the line in step S209 is extracted as an. endpoint block (step S210).

A check is made in step S211 to determined whether or not the processes of steps S109 and S210 have been completed for all blocks projected as line candidates in steps S202 and S204. If processes have not been completed, the process continues to the next block (step S212), and the processes of steps S209 and S210 are repeated. When the processes of steps S209 and S210 are completed for all blocks projected as line candidates in steps S202 and S204, the routine continues to step S213. Then, each line is recognized as a line segment based on the endpoint blocks of line segments extracted in step S210 (step S213).

Each block within a square is checked to determine whether or not it is a point on an edge [1] line segment recognized in step S213 (step S214), and if the block is on a line segment, label [1] is written (Step S215). Each block within a square is checked to determine whether or not they are points on edge [−1] line segment recognized in step S213 (step S216), and if these blocks are on a line segment, label [−1] is written (step S217). Blocks other than the aforesaid blocks are labeled [0] (step S218).

In step S219, a check is made to determine whether or not the processes of steps S214–S218 have been completed for all blocks within a square. If processes have not been completed, the process advances to the next block (step S220), and the processes of steps S214–S218 are repeated.

This process is accomplished for edge data in the vertical direction and horizontal direction, and corrected edge data are written to edge data memories 29 and 30.

Figure 19:
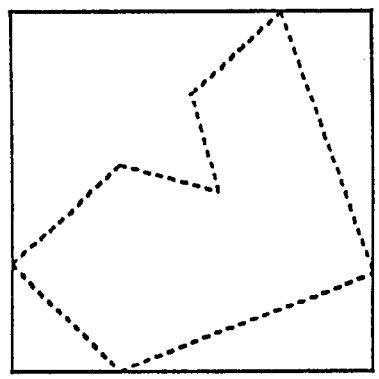
FIG. 19 is an illustration showing the edge of a dot region including erroneously distinguished blocks.
Figure 20:
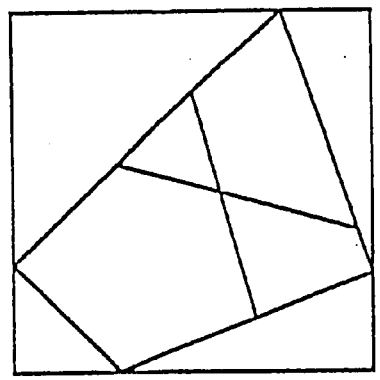
FIG. 20 is an illustration showing the edge of a dot region after erroneous edge correction processing.

If the edge illustrated in FIG. 19 showing a plurality of line segments on a straight line is corrected by the previously described method, the result is shown in FIG. 20 (the plurality of line segments on the same straight line are distinguished as a single line segment), such that accurate edge correction is not achieved. Edge correction process 3 corrects the aforesaid problem and is described below.

Edge Correction Process 3

Figure 21:
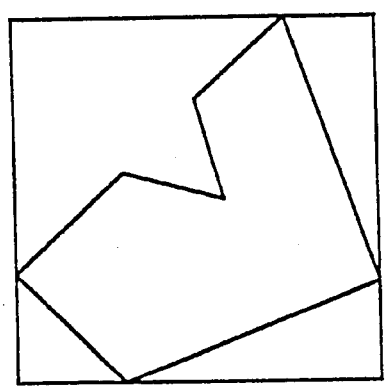
FIG. 21 is an illustration showing the edge of a dot region after edge correction processing.

FIG. 19 shows the edge (dashed line in the drawing) of a dot region in a dot map including erroneously distinguished blocks. The edge of the dot region is process in accordance with the flow chart of FIG. 18, and corrected as shown in FIG. 21.

Figure 18:
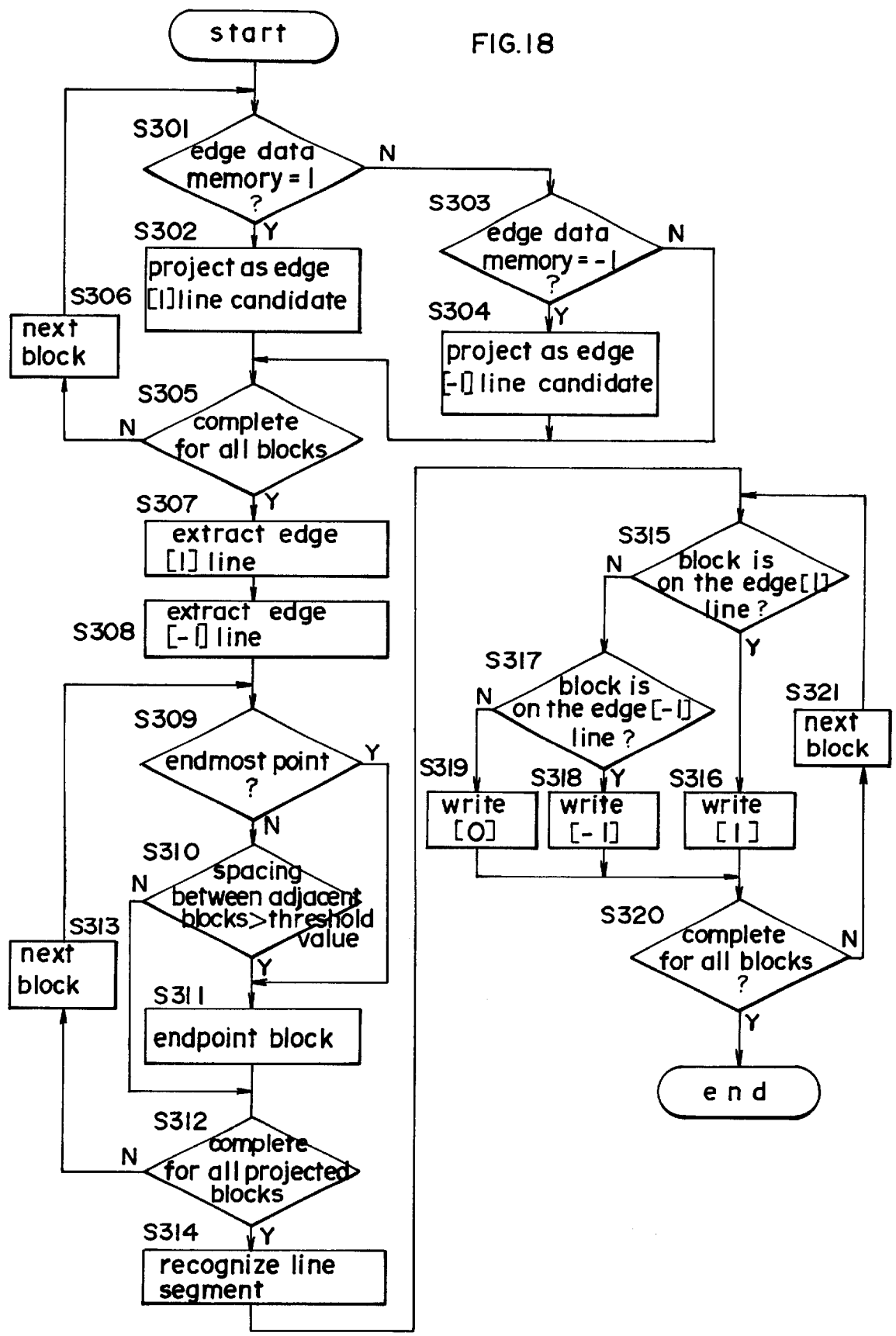
FIG. 18 is a flow chart of edge correction process 3.

The flow chart of FIG. 18 is described below. Steps S301–S308 are identical to those of edge correction process 1 (steps S101–S108 of the flow chart of FIG. 10). Then, points projected as line candidates in steps S302 and S304 are checked to determine whether or not said points are endmost points of a line extracted in steps S307 and S308 in the same manner as in step S209 of edge correction process 2 (step S309).

In the determination of step S309, blocks distinguished as endpoints of line segments are extracted as endpoint blocks of the line segment (step S311). Other blocks are checked to determine whether or not the spacing (i.e., spacing between adjacent blocks) of each edge block projected as line candidates in steps S302 and S304 are greater than a threshold value (step S310). Blocks determined to have spacing greater than a threshold value in step S310 are extracted as endpoint blocks of the line segment (step S311).

Steps S310 and S311 are described in detail hereinafter. Since the distance between edge blocks can be expressed by the magnitude of $\Delta\rho$ or $\Delta\theta$ (the spacing of points on a straight line parallel to the X-axis, Y-axis in FIG. 17 can be expressed as $\Delta\rho$, and other points on the line can be expressed as the magnitude of $\Delta\theta$), such that when $\Delta\rho$ or $\Delta\theta$ on the $\rho$-$\theta$ plane is greater than a certain spacing (threshold value), two points enclosing said spacing are determined as endpoints of separate line segments.

That is, when the spacing of each edge block to an adjacent edge block is greater than a threshold value, those two edge blocks are endpoints of separate line segments (since no other edge blocks are present between said two edge blocks).

When edge blocks having several points enclosing a space are not present, the blocks can be eliminated as isolated points. Thus, endpoints can be extracted with greater accuracy.

The threshold value of spacing of edge blocks may be variably set as parameters for the size of the square region.

In step S312, a check is made to determine whether or not the processes of steps S309~S311 have been executed for all blocks projected as line candidates in steps S302 and S304. If processes have not been completed, the process advances to the next block (step S313), and the processes of steps S309~S313 are repeated. When processes of steps S309~S311 have been completed for all blocks projected as line candidates in steps S302 and S304, the process advances to step S314. Then, in step S314, each straight line is recognized as a line segment based on the endpoint blocks of extracted line segments (step S314).

Steps S315~S321 are identical to those of edge correction process 2 (steps S214~S220 in the flow chart of FIG. 13).

The aforesaid processes are executed for edge data in the vertical direction and horizontal direction, and the corrected edge data are written to edge data memories 29 and 30.

All optional polygonal shaped regions can be extracted via this method.

Edge Correction Process 4

Figure 22:
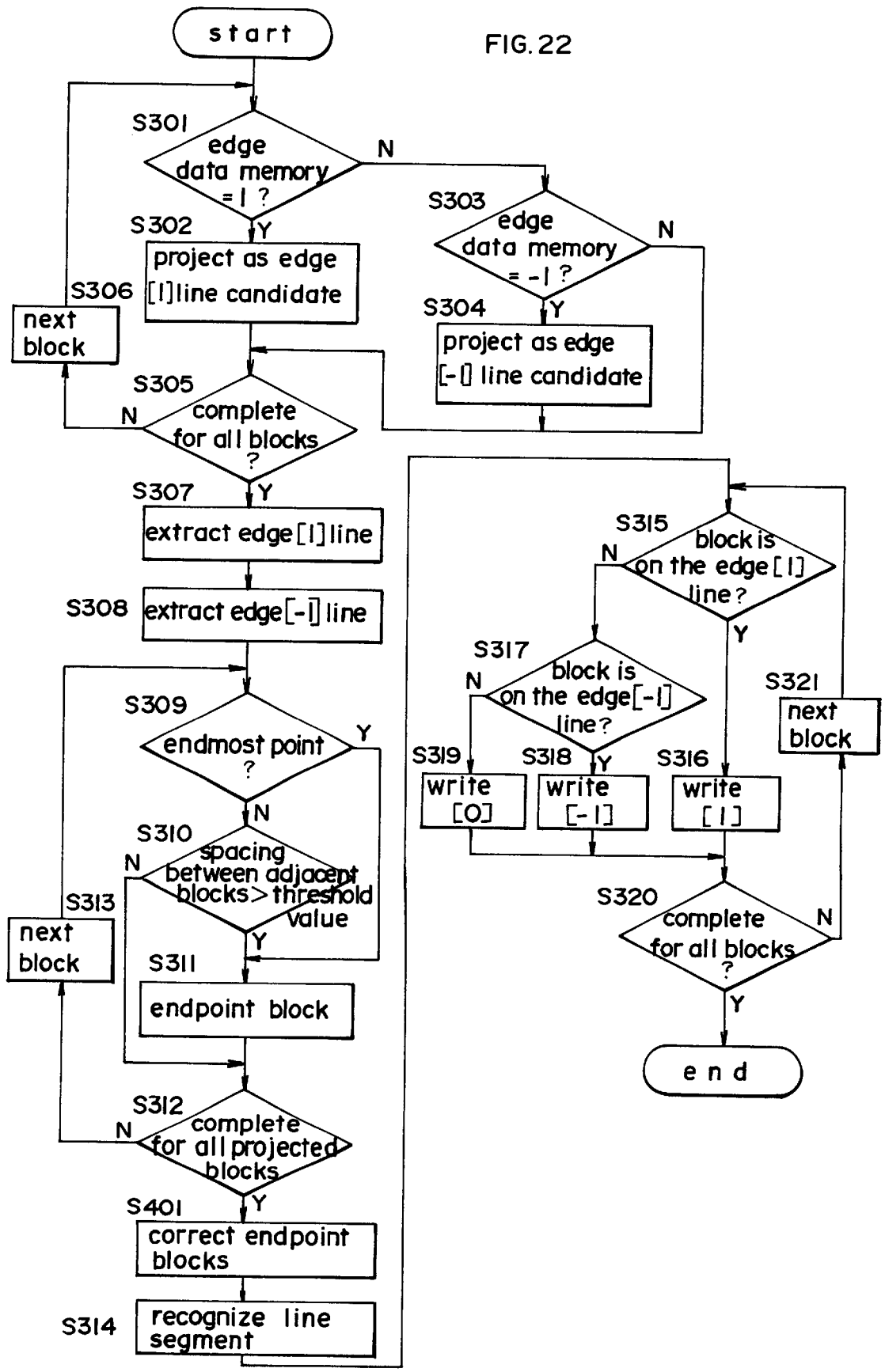
FIG. 22 is a flow chart of edge correction process 4.

The edge of the dot region of FIG. 19 is processed in accordance with the flow chart of FIG. 22 in the same manner as in edge correction process 3, and corrected as shown in FIG. 21.

The flow chart of FIG. 22 is described below. With the exception of the addition of step S401, processing is identical to that of edge correction process 3 (flow chart of FIG. 18), and the step numbers are identical to that of FIG. 18 except for step S401. Steps other than step S401 are omitted form the discussion.

In edge correction process 3, blocks distinguished as having block spacing greater than a threshold value in step S310 are extracted as endpoint blocks of a line segment, using this method alone allows erroneous identification of blocks which are not line segment endpoints as endpoint blocks. For example, when the spacing of a block projected as a line candidate in a single line segment is a block which exceeds the threshold value, this block is erroneously extracted as a line segment endpoint block. Edge correction process 4 includes an additional process (step S401) for correcting said erroneously identified endpoint blocks.

The endpoint block correction process (step S401) is described in detail below. The positions of all blocks extracted in step S311 are previously stored in memory. In step S310, blocks identified as having block spacing which exceeds a threshold value (blocks having a high possibility of being line segment endpoints) are checked to determine whether or not such blocks are endpoints of other line segments (whether or not the same blocks were extracted twice in step S311).

The final extracted region is uniquely closed, such that line segment endpoints may be endpoints of other line segments. Conversely, other endpoints may not be endpoints of the region. Thus, only blocks determined to be endpoints of other line segments are freshly extracted as line segment endpoint blocks.

According to this method, it is possible to accomplish line segment endpoint extraction with greater precision. Optional polygonal shaped regions can therefore be extracted with greater accuracy.

Although four edge correction processes have been described, when extracting polygonal regions having complex shapes, edge correction process gets complicated. Therefore process suited to the shape of a polygonal region should be selected.

Region writing section 35 is described below. In region writing section 35, dot regions labeled [1], and other regions labeled [0] are rewritten based on [1] and [−1] data stored in vertical edge data memory 29 and horizontal edge data memory 30. Specifically, as for horizontal edge data, the right side of [1] and the left side of [−1] are written as dot regions. As for vertical edge data, the lower side of [1] and the upper side of [−1] are written as dot regions.

Since other edge data [1] and [−1] are encircled between edge data [1] and [−1] the following process is executed. For example, when edge data are sequentially from the left side (or upper side) [1,1,−1], the center datum [1] is ignored. Similarly, when edge data are sequentially from the left side (or upper side) [1,−1,−1], the center datum [−1] is ignored. When edge data are sequentially form the left side (or upper side) [1,1,−1,−1], the center data [1,−1] are ignored.

Figure 23:
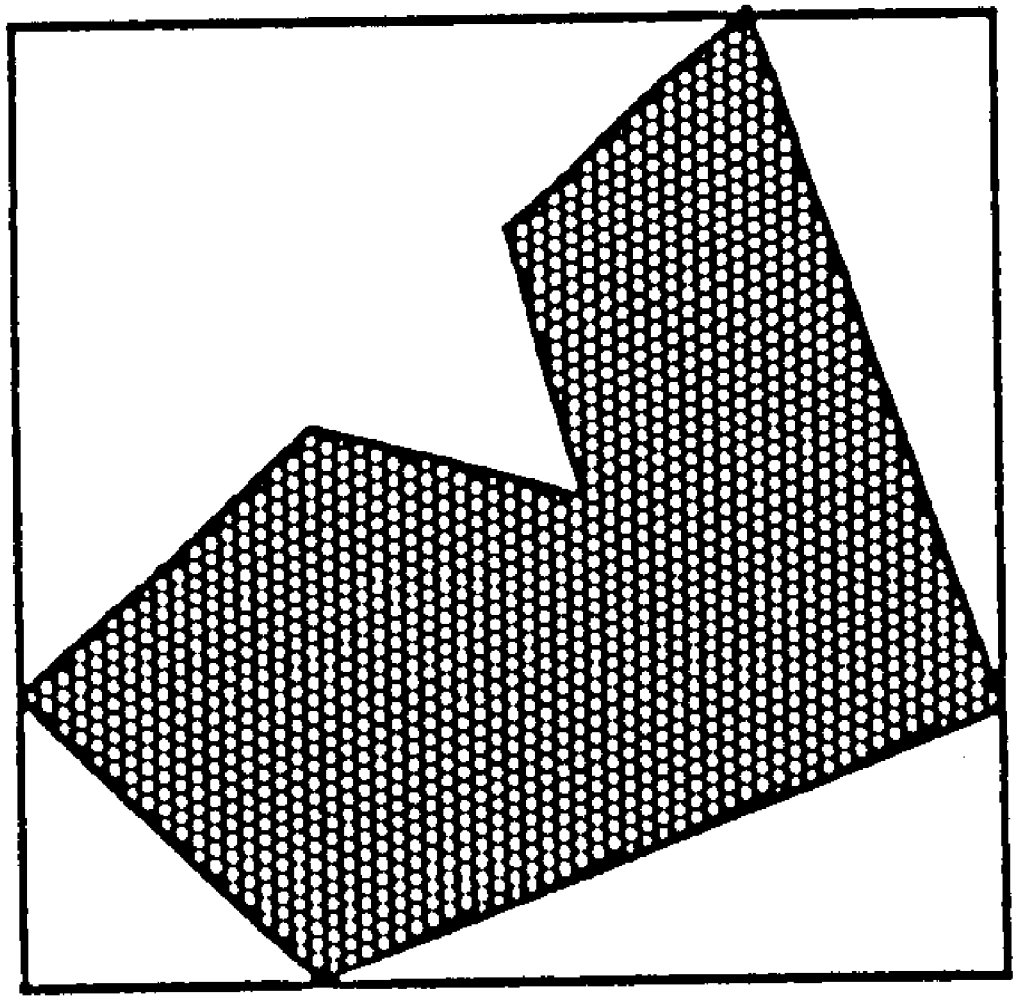
FIG. 23 shows the final dot region.

The aforesaid processes are executed for edge data of the vertical direction and horizontal direction, and finally dot regions similar to that of FIG. 23 are formed by AND map of the vertical direction map and horizontal direction.

As previously described, dot regions are extracted, and after photograph regions are similarly extracted they are combined to form a single bit map by synthesized bit map formation section 26. That is, bit maps are created using blocks comprising two bits, i.e., dot blocks are [01], photo blocks are [10], and other blocks are [00]. Other blocks correspond to character blocks and background blocks. Character blocks and background blocks are handled identically, such that background can be discerned between characters, and there is no further problem in actual subsequent image processing of backgrounds.

Actual picture element data stored in matrix memory 12 using bitmaps of the attribute blocks finally created, i.e., using the attribute of each region in a document image, are processed suitably for each attribute to produce a high quality image which can be subjected to image data compression.

Figure 24:
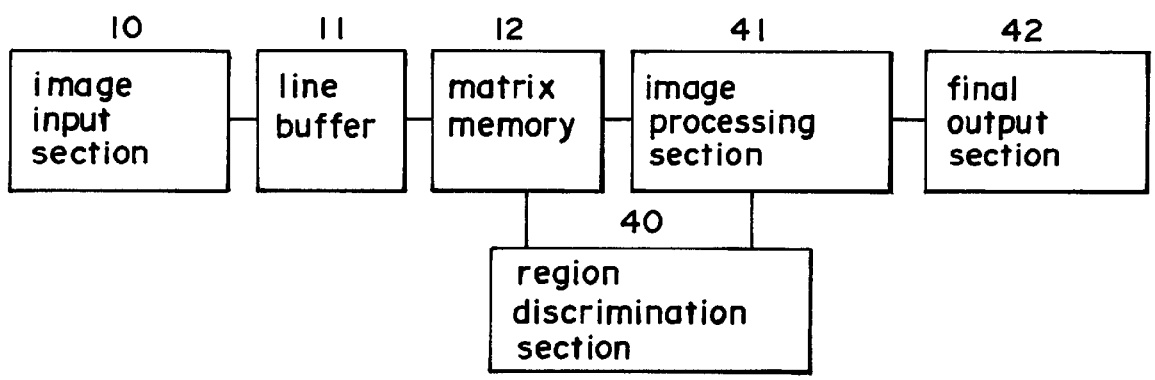
FIG. 24 is a block diagram showing the construction of an apparatus for executing the image processing of the present invention.

Processing actually executed by facsimile machines and digital copying apparatus and the like is described with reference to FIG. 24. In image input section 10, every picture element of a document image is read, and the read image data are input to line buffer 11, and thereafter the description is as described relative to FIG. 1 until storage in matrix memory 12. Region discrimination is executed by the previously mentioned region discrimination section 40, and the attribute of each region in a document image is determined. Thereafter, processing is executed suitable to each attribute by image processing section 41 based on actual picture element data stored in matrix memory 12 and the attribute of each region determined by region discrimination section 40, so as to output an image processed by final output section 42.

Although picture element data of a single image frame are stored in matrix memory 12 and thereafter are subjected to processing for attribute identification and the like in the present embodiment, it is to be understood that the present invention is not limited to such a process. For example, a matrix memory may be used which is capable of storing picture element data of a size suitable for a 7×7 isolated point count filter, for example, 14×14 picture elements, rather than using a large capacity matrix memory capable of storing picture element data of a single image frame. In such circumstances, block attributes can be discriminated in real time for picture element data of 14 lines by 14 rows stored in matrix memory, and discrimination results can be sequentially stored in a bitmap memory for each attribute.

In this case, a line buffer must have a capacity capable of storing picture element data of at least 13 lines. When all image attributes are thus distinguished, the results can be used for staged image processing suitable for actual picture element data, which requires reading a document image another time.

Another method provides processing using a matrix memory capable of storing picture element data of ¼ of a document. In this case, attribute distinguishing and region extraction processes can be executed simultaneously in units of ¼ document, such that complete processing can be accomplished without rereading the document as described above.

In the present embodiment, in order to reduce the amount of memory used, picture element data of a document image are divided into predetermined blocks, the attribute of each block is distinguished, after which dot map memory 18 and photo map memory 19 are generated, after which subsequent processing is accomplished in block units based on said map memory data. However, it is to be understood that dot map memory 18 and photo map memory 19 may be created by distinguishing attributes in picture element units, and executing subsequent processing in picture element units based on said map memory data.

As previously described, the present invention distinguishes attributes of an image in imaginary block units, and uses block attribute data to extract regions and process attribute discrimination of said regions. Thus, the data handled for all blocks is extremely small, making it possible to greatly reduce the amount of memory used and allow high-speed processing.

Distinguishing the attribute of each block is accomplished using all picture element data within the block, such that suitable discrimination precision can be expected.

The attribute of a once distinguished block is added to the attributes of encircling blocks and corrected again, such that the final result of distinguishing the attribute is markedly more precise.

Furthermore, since attribute boundaries are recognized as straight lines (line segments), the attributes of optionally shaped polygonal regions can be distinguished. Accordingly, distinguishing the attribute of regions having a variety of patterns can be achieved with a precision greater than that achieved by conventional technologies.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image processing apparatus, comprising:
   receiving means for receiving image data for an original image;
   dividing means for dividing the image data into a plurality of small blocks, each of the small blocks containing a plurality of pixels;
   first determining means for determining an attribute of each of the plurality of the small blocks;
   identifying means for identifying an area that includes a plurality of the small blocks having a same attribute;

wherein the identifying means first scans the image data in a first scan direction and identifies blocks having a same attribute;

wherein the identifying means scans the image data in a second scan direction and identifies blocks having a same attribute; and wherein the identifying means identifies a first start line and a first end line for the area, said first start line and said first end line extending transversely to the first scan direction.

2. The image processing apparatus of claim 1, wherein the identifying means identifies a second start line and a second end line for the area, said second start line and said second end line extending transversely to the second scan direction.

* * * * *